(12) United States Patent
Green

(10) Patent No.: US 10,398,128 B2
(45) Date of Patent: Sep. 3, 2019

(54) AUTOMATED ANIMAL FEED DISPENSER AND METHOD

(71) Applicant: Larry Green, Carson City, NV (US)

(72) Inventor: Larry Green, Carson City, NV (US)

( * ) Notice: Subject to any disclaimer, the term of this patent is extended or adjusted under 35 U.S.C. 154(b) by 432 days.

(21) Appl. No.: 14/701,497

(22) Filed: Apr. 30, 2015

(65) Prior Publication Data

US 2015/0313179 A1 Nov. 5, 2015

Related U.S. Application Data

(60) Provisional application No. 61/986,834, filed on Apr. 30, 2014.

(51) Int. Cl.
*A01K 5/02* (2006.01)

(52) U.S. Cl.
CPC .......... *A01K 5/0291* (2013.01); *A01K 5/0275* (2013.01)

(58) Field of Classification Search
USPC ......... 119/51.01, 52.1, 53, 56.1, 57.1, 57.92, 119/51.11; 221/90; 211/59.2, 49.1
See application file for complete search history.

(56) References Cited

U.S. PATENT DOCUMENTS

| 464,067 | A | * | 12/1891 | Foster | |
|---|---|---|---|---|---|
| 857,037 | A | * | 6/1907 | Davison | |
| 1,442,382 | A | * | 1/1923 | Bullock | A01K 5/0291 119/51.11 |
| 2,585,371 | A | * | 2/1952 | Coffing | A01K 5/0291 119/51.11 |
| 3,685,689 | A | * | 8/1972 | Borner | G07F 11/06 221/90 |
| 3,946,846 | A | * | 3/1976 | Pepiciello | G07F 11/06 194/343 |
| 4,284,207 | A | * | 8/1981 | Christian | G07F 11/06 221/90 |
| 4,411,375 | A | * | 10/1983 | Christian | G07F 11/06 221/90 |
| 5,152,560 | A | * | 10/1992 | Heydendahl | E05B 47/0002 292/131 |
| 5,345,893 | A | * | 9/1994 | Morris | A01K 5/0291 119/51.11 |
| 5,681,070 | A | * | 10/1997 | Williams | E05B 15/04 292/153 |
| 5,915,766 | A | * | 6/1999 | Baumeister | B04B 7/06 292/201 |

(Continued)

*Primary Examiner* — Andrea M Valenti
(74) *Attorney, Agent, or Firm* — Long & Chybik; John D. Long, Esq.

(57) ABSTRACT

One embodiment of the invention could be an automated animal feed dispenser and method, the automated animal feed dispenser comprising a three-wall cabinet generally forming a hollow interior and further defining a feed delivery slot that connects to an angled slide located within the hollow interior; a set of vertically-stacked and spaced-apart drop shelves support animal feed located within the hollow interior, each drop shelf hingedly connects to the cabinet; a set of latches supported by the cabinet, each latch comprises a motorized automotive door lock that controls the drop of a respective drop shelf; a latch control system operates the latches to drop the drop shelves in a timed and sequenced manner that allows dropped drop shelves to successively overlay one another to create a progressively angled slide that empties down upon the angled slide.

15 Claims, 13 Drawing Sheets

(56) References Cited

U.S. PATENT DOCUMENTS

| | | | | |
|---|---|---|---|---|
| 6,405,674 | B1* | 6/2002 | Majewski | A01K 5/0291 119/51.13 |
| 2004/0216681 | A1* | 11/2004 | Lesher | A01K 5/0291 119/51.13 |
| 2005/0213266 | A1* | 9/2005 | Mickelson | A01K 5/0291 361/1 |
| 2007/0044724 | A1* | 3/2007 | Kvols | A01K 5/01 119/56.1 |
| 2007/0181513 | A1* | 8/2007 | Ward | A01K 5/0291 211/59.2 |

* cited by examiner

AUTOMATED ANIMAL FEED DISPENSER AND METHOD

STATEMENT REGARDING FEDERALLY SPONSORED RESEARCH OR DEVELOPMENT

Not Applicable

REFERENCE TO A "MICROFICHE APPENDIX"

Not Applicable.

FIELD OF THE INVENTION

The present invention generally relates to automated animal feed dispensers. More particularity to those automated animal feed dispensers utilizing a vertically stacked set of drop shelving to deliver food to the animals in a timed manner.

BACKGROUND

Livestock, such as horses, mules, donkeys, cattle and the like, when in natural environments will ordinarily graze or feed for long periods of time during a day. It is desirable to maintain the animal's overall health by trying to replicate this natural daily feeding pattern when the animal in captivity is not pasture kept. When the animal is kept in captivity in a more confined space such as a paddock, barn, corral and the like, the animal's desired gazing pattern may be assisted by generally feeding the animal several times a day at regular timed intervals. This daily repeated feeding pattern may be also employed when such an animal is not well (e.g., having an ulcerated digestive tract) and is required to eat small amounts of food repeatedly provided during the day in order to heal and get better. Providing such regulated repeated animal feeding during a day may require a significant amount of the animal owner's time and capability. Sickness, work schedules, away vacations and emergencies that may impact the owner may also interfere with the owner provided daily repeated animal feedings as well.

One possible solution to overcome such feeding issues could be an automated animal feed dispenser that could automatically and repeatedly dispense a premeasured amount of the animal's feed to the area where the animal is found or kept according to a desired feeding schedule. These animal feed dispensers may have reliability issues in that they may get jammed or otherwise fail to reliably deliver feed to the animals. What could be needed therefor is a dependable and reliable automated animal feed dispenser that may utilize a simple and efficient food delivery mechanism.

One such possible solution to these issues could be the present invention, an automated animal feed dispenser that could utilize drop shelving (e.g., that may operate through the force of gravity) to increase operational reliability. Such an automated animal feed dispenser could feature a three-sided cabinet with a hollow interior. The cabinet could generally be formed by a cabinet middle wall connecting to two cabinet end walls to form an open rear or back side that is opposite the cabinet middle wall. The bottom of the cabinet's middle wall could denote a feed delivery slot that further connects to a bottom of an angled slide located within the cabinet's interior. Located over the angled slide and within a cabinet interior could be a vertically stacked set of spaced-apart drop shelves or flaps. Each respective drop shelf could have a first edge and a second edge, the first edge could be connected to a rod, the rod substantially being located between and movably connecting to the two cabinet end walls, allowing the drop shelf to generally pivot about the rod/first edge. The opposing second edge could interact with a respective motorized latch located on an inner or back side of the cabinet's middle wall. The motorized latch could engage and hold a respective drop shelf in a horizontal orientation.

Each motorized latch could be further connected to a power source through a programmable electronic latch control system comprising a sequencer circuit and a timer circuit that functions drop the respective motorized latches in a timed top-to-bottom order on a programmable feeding schedule (e.g., providing for repeated feed drops during the day.) When the motorized latch is activated, the motorized latch could release a respective second edge to allow the respective drop shelf to pivot downward by its hinged first edge to drop the animal feed that is stored upon the drop shelf.

As the feed drops down into the cabinet, the feed would hit and then be guided by the angled slide to the feed delivery slot to exit the cabinet's hollow interior. As the drop shelving drops down in its sequence, that drop shelf that drops next could angularly overlay the earlier and below dropped drop shelf to collectively form a progressively angled slide that further assists the feed's delivery movement down to the angled slide and out the dispenser.

SUMMARY OF ONE EMBODIMENT OF THE INVENTION

Advantages of One or More Embodiments of the Present Invention

The various embodiments of the present invention may but do not necessarily achieve one or more of the following advantages:

to provide an automated animal feed dispenser that substantially utilizes a vertical stack of spaced-apart, hinged drop shelving or flaps within an open-backed cabinet, the drop shelving could drop down in hinged manner to dispense feed;

the ability to reliably dispense feed over a period of time using drop shelving that could be released by substantially sealed automotive door locks;

to provide an automated animal feed dispenser that utilizes stacked drop shelving or flaps that could overlap previously dropped drop shelves to create or form a progressively angled slide that assists the delivery of dropped feed;

the ability to generally use an electronic latch control system having sequencer and timer circuits that substantially set the timing and sequential order for operating motorized latches that could control the dropping of their respective drop shelves; and provide an automated feed dispenser that substantially utilizes a sequential dropping of stacked, spaced-apart drop shelves that may be hingedly connected to an open-backed cabinet to generally dispense animal feed, the dropped shelves organizing themselves progressively angled slide to assist the propulsion and direction of the dropped feed out of the dispenser.

These and other advantages may be realized by reference to the remaining portions of the specification, claims, and abstract.

Brief Description of One Embodiment of the Present Invention

One possible embodiment of the present invention could be an automated animal feed dispenser comprising a three-wall cabinet comprising a middle wall straddled by two side walls to form a rear opening by which a hollow interior as formed by the three-wall cabinet can be accessed, the middle wall further having a bottom portion defining a feed delivery slot that connects to an angled slide located within a bottom of the hollow interior; a set of vertically stacked and spaced apart drop shelves that can individually support animal feed, the set being hingedly connected to the three-wall cabinet to locate the set within the hollow interior above the angled slide, each drop shelf having a front edge and a back edge; a plurality of electrically operated latches, each electrically operated latch of the plurality being located on a backside of the middle wall, each electrically operated latch of the plurality removably attaches to a respective drop shelf proximate to the front edge of that drop shelf to control the drop of the respective drop shelf; an electronic latch control system that operates the plurality to sequentially drop the drop shelves in a timed manner from the horizontal position to a non-horizontal drop position; wherein when the drop shelves are dropped during operation, the drop shelves overlap one another to create a progressive slide within the hollow interior that empties down upon the angled slide.

Another possible embodiment of the present invention could be an automated animal feed dispenser comprising a three-wall cabinet having a middle wall straddled by two side walls to form a rear opening by which a hollow interior formed by the three-wall cabinet can be accessed, the middle wall further having a bottom portion defining a feed delivery slot that connects to an angled slide located within a bottom of the hollow interior; a set of vertically stacked and spaced apart drop shelves that can individually support animal feed, the set of drop shelves being located within the hollow interior above the angled slide, each drop shelf having a front edge and a back edge, the drop shelf hingedly connects to the two side walls; a plurality of electrically operated latches located on a backside of the middle wall, each electrically operated latch of the plurality comprises a motorized automotive door lock actuator connected to a lock mechanism, the lock mechanism removable attaches to the respective drop shelf to hold the respective drop shelf at a feed supporting horizontal position; and an electronic latch control system that operates the plurality to sequentially drop the drop shelves by a bottom-to-top order in a timed manner, the drop shelves when so dropped from the feed supporting horizontal position to a non-horizontal drop position to overlap one another to create a progressive slide.

Yet still another possible embodiment of the present invention could be method of operating an automated animal feed dispenser comprising the following steps; providing an automated animal feed dispenser comprising a three-wall cabinet generally forming a hollow interior and further defining a feed delivery slot that connects to an angled slide located within the hollow interior; a set of vertically-stacked and spaced-apart drop shelves that can support animal feed located within the hollow interior, each drop shelf hingedly connects to the cabinet; a plurality of electrically operated latches supported by the three-sided cabinet, each electrically operated latch of the plurality comprises a motorized automotive door lock actuator that connects to a lock mechanism to control the respective drop of a respective drop shelf; a latch control system operates the plurality to drop the drop shelves in a timed and sequenced manner that allows dropped drop shelves to successively overlay one another to create a progressive slide that empties down upon the angled slide; placing one or more drop shelves of the set into a feed supporting horizontal position by engaging respective electrically operated latches of the plurality; and engaging the latch control system to sequentially drop the drop shelves by a bottom-to-top order in a timed manner to allow the dropped drop shelves to overlap one and other to form a progressively angled slide within the hollow interior, the progressively angled slide coming to rest upon the angled slide.

The above description sets forth, rather broadly, a summary of one embodiment of the present invention so that the detailed description that follows may be better understood and contributions of the present invention to the art may be better appreciated. Some of the embodiments of the present invention may not include all of the features or characteristics listed in the above summary. There are, of course, additional features of the invention that will be described below and will form the subject matter of claims. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

The present invention 10 could be an automated animal feed dispenser 20 and a method of operation 100 for same. The invention 10 may have a generally intended purpose of timed and scheduled feeding of animals. These animals (not shown) may include domesticated livestock such as horses, mules, donkeys, ponies, lamas and the like or may include non-domesticated animals such as deer, elk, pigs, turkeys and the like. The invention 10 could also be used with animals not keep in an enclosed or confined area but are keep in open fields or the like. The invention's automated animal feeding could provide the animal(s) with the only feeding or the invention 10 could be used to augment the animal's naturally obtained daily diet/feeding.

Figure 1:
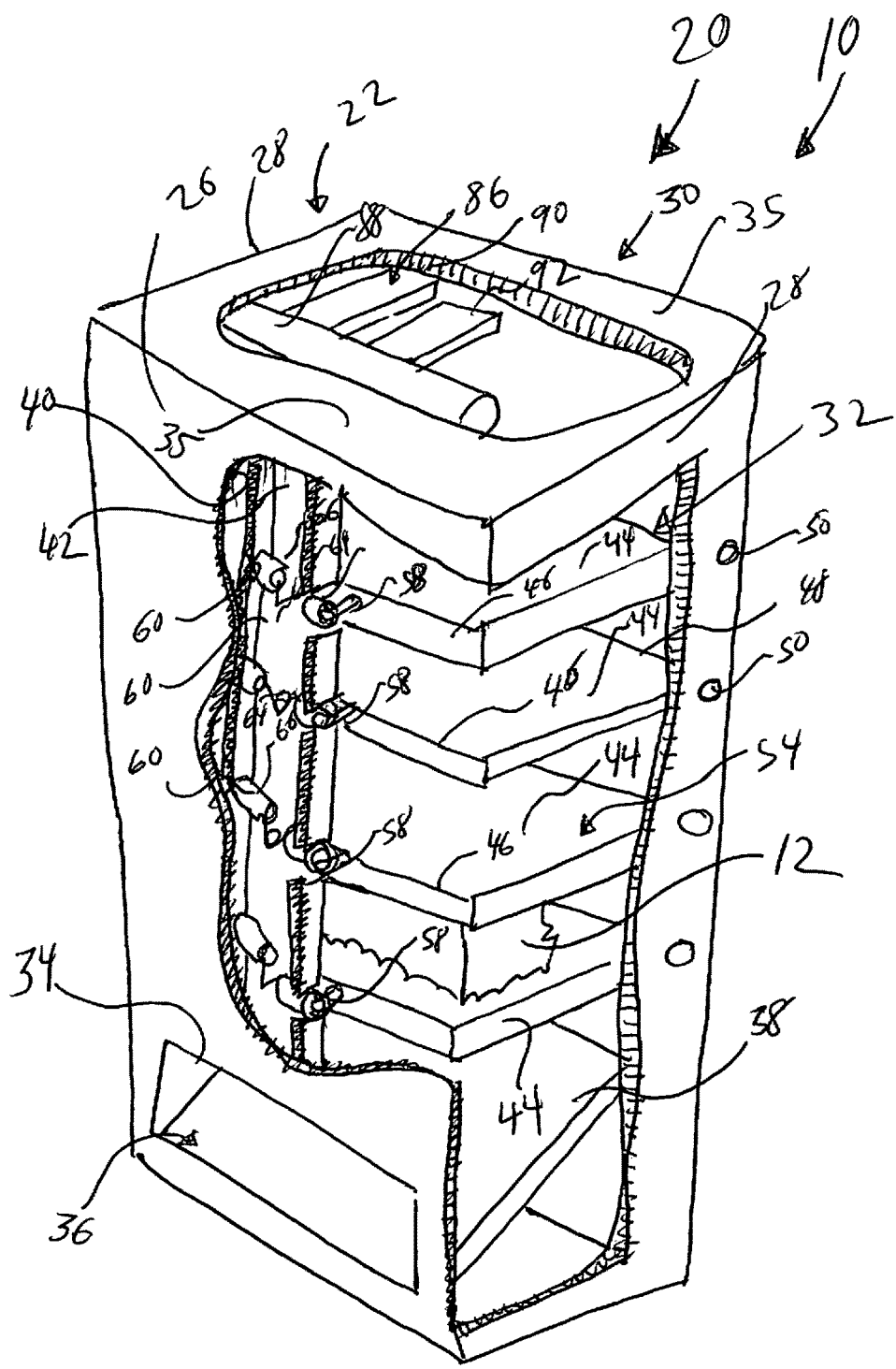
FIG. 1 is substantially showing a cutaway perspective frontal view of one possible embodiment of the present invention with the drop shelves in the horizontal position.
Figure 2:
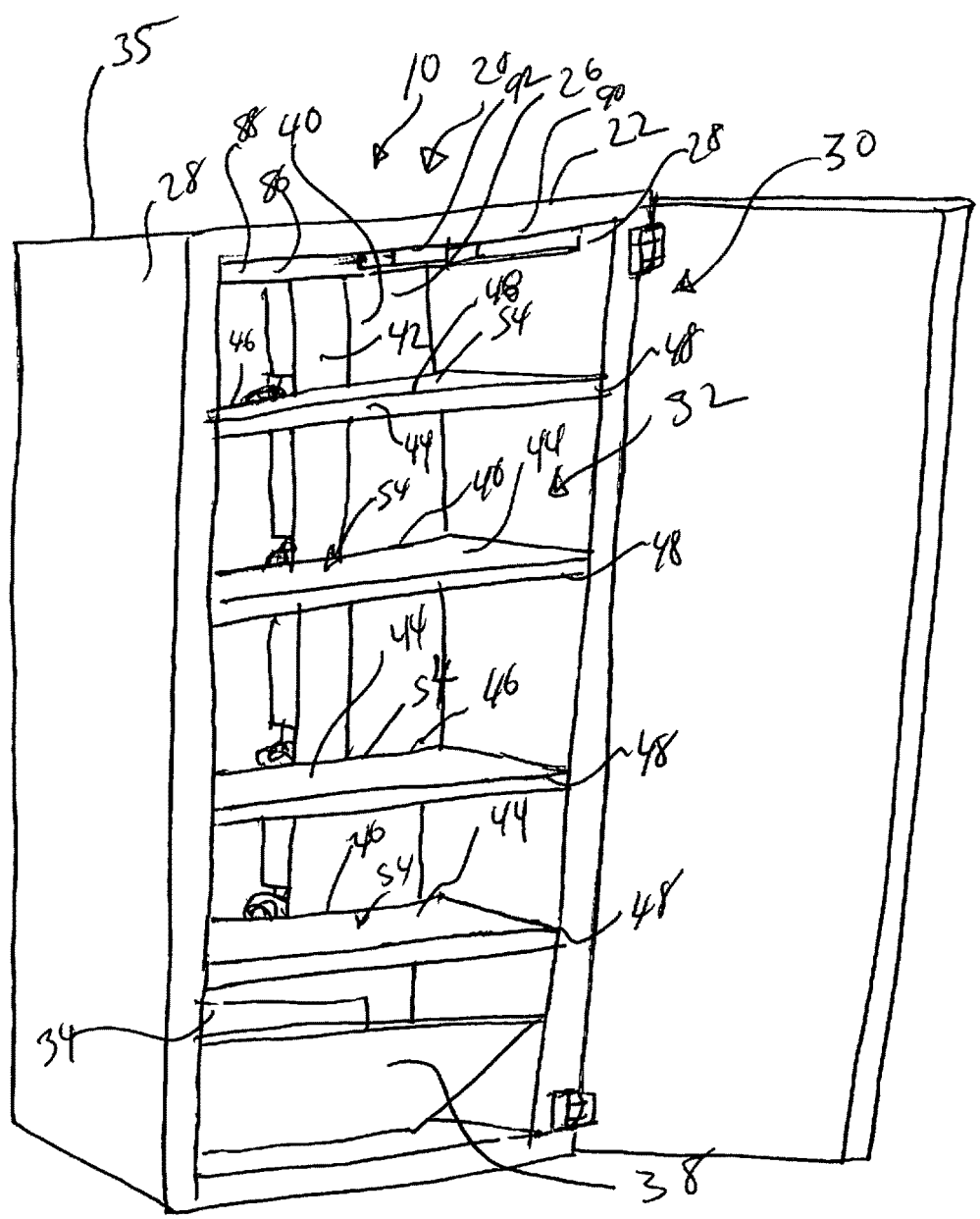
FIG. 2 is substantially showing a cutaway perspective rear view of one possible embodiment of the present invention with the drop shelves in the horizontal position.

As substantially shown in FIGS. 1 and 2, the automated animal feed dispenser 10 could comprise a three-wall cabinet 22; a vertical stack of spaced-apart drop selves 44; a plurality of motorized latches 60 with each motorized latch 60 engaging a respective drop shelf 44 to control the movement of the respective drop shelf 44 between a feed storage/support horizontal position 54 and a feed delivery or drop non-horizontal position 56 (as substantially shown in FIG. 3); and a electronic latch control system 86 with a sequencer circuit and a timing circuit for operating the plurality of motorized latches 60.

The three-wall cabinet 22 could be fabricated out of suitable materials such a sheet metal that is supported and strengthened by a metal channel frame work. The three-wall cabinet 22 could have a middle wall 26 straddled by two side walls 28 to form a rear opening 30 by which a hollow interior 32 of the three wall cabinet 22 can be accessed. The middle wall 26 could be oriented to be perpendicular to the two side walls 28, which in turn could have a spaced apart and parallel orientation to each other. The three wall cabinet 22 could also feature a plate as its top 35 generally continuously connecting the two side walls 28 and middle wall 26 together as well as supporting the electronic latch control system 86. A bottom portion of the middle wall 26 could further define a feed delivery slot 34 that may be connected to a bottom 36 of an angled slide 38 located within the hollow interior 32. The inner or back side 40 of the middle wall 26 could support along its longitudinal centerline a hat channel cover 42 (generally locating the hat channel cover 42 within the hollow interior 32) that can be used to generally contain and support the plurality of motorized latches 60 as well as a wiring connecting the plurality to electronic latch control system 86.

The vertical stack of spaced-apart set of drop shelves or flaps 44 could be located within the hollow interior 32 directly above the angled slide 38. Each drop shelf 44 could present a front edge 46 and a back edge 48, the back edge 48 substantially supports a rod 50 along a length of the back edge 48. The rod 50 could terminate in two rod ends, each rod end movably connects to an aperture in the respective side wall 28 to generally locate the back edge 48 proximate to the rear opening 30. This location of the respective drop shelf 44, allows the drop shelf 44 to pivot about the back edge 48 when moving between a horizontal (e.g., feed storage) position 54 to a dropped or generally a vertical (e.g., feed delivery or dispensing) position 56 (substantially shown in FIG. 3).

Figure 2A:
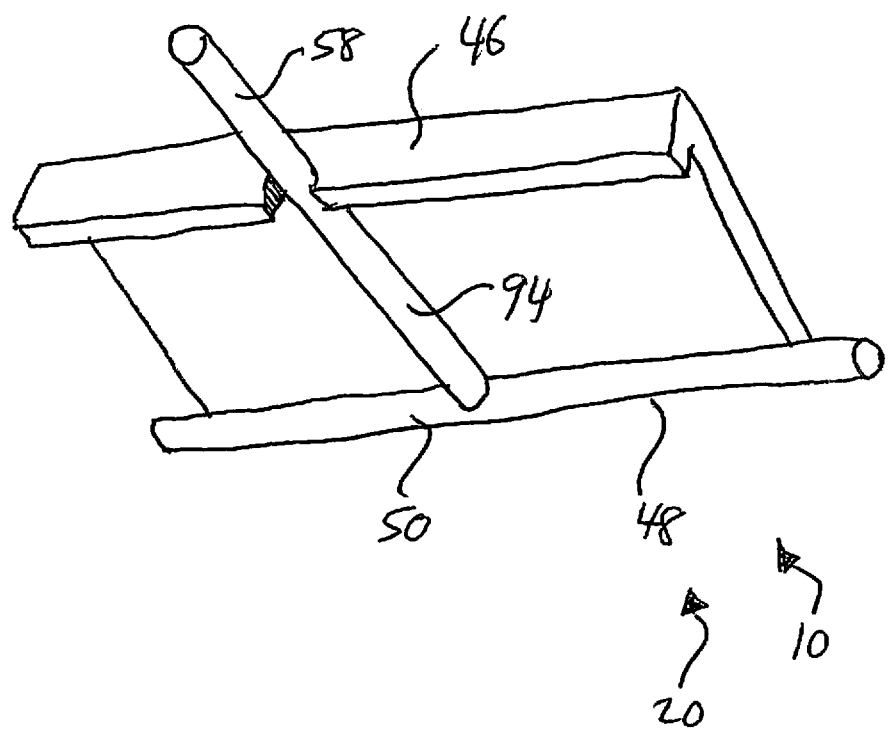
FIG. 2A is substantially showing a cutaway perspective underside view of one possible embodiment of the drop shelf of the present invention.

A latch projection 58 (e.g., a rod loop) moving out from the front edge 46 can removably engage a portion of the respective motorized latch 60 (e.g., lock mechanism 62) that is generally contained within the hat channel cover 42 to hold generally the respective drop shelf 44 in the horizontal position 54. In another embodiment, a bar 94 could bisect the drop shelf 44 from the back edge 48 to the front edge 46 and to generally project outward from the front edge 46 to form the latch projection 58 (as substantially shown in FIG. 2A).

Figure 3:
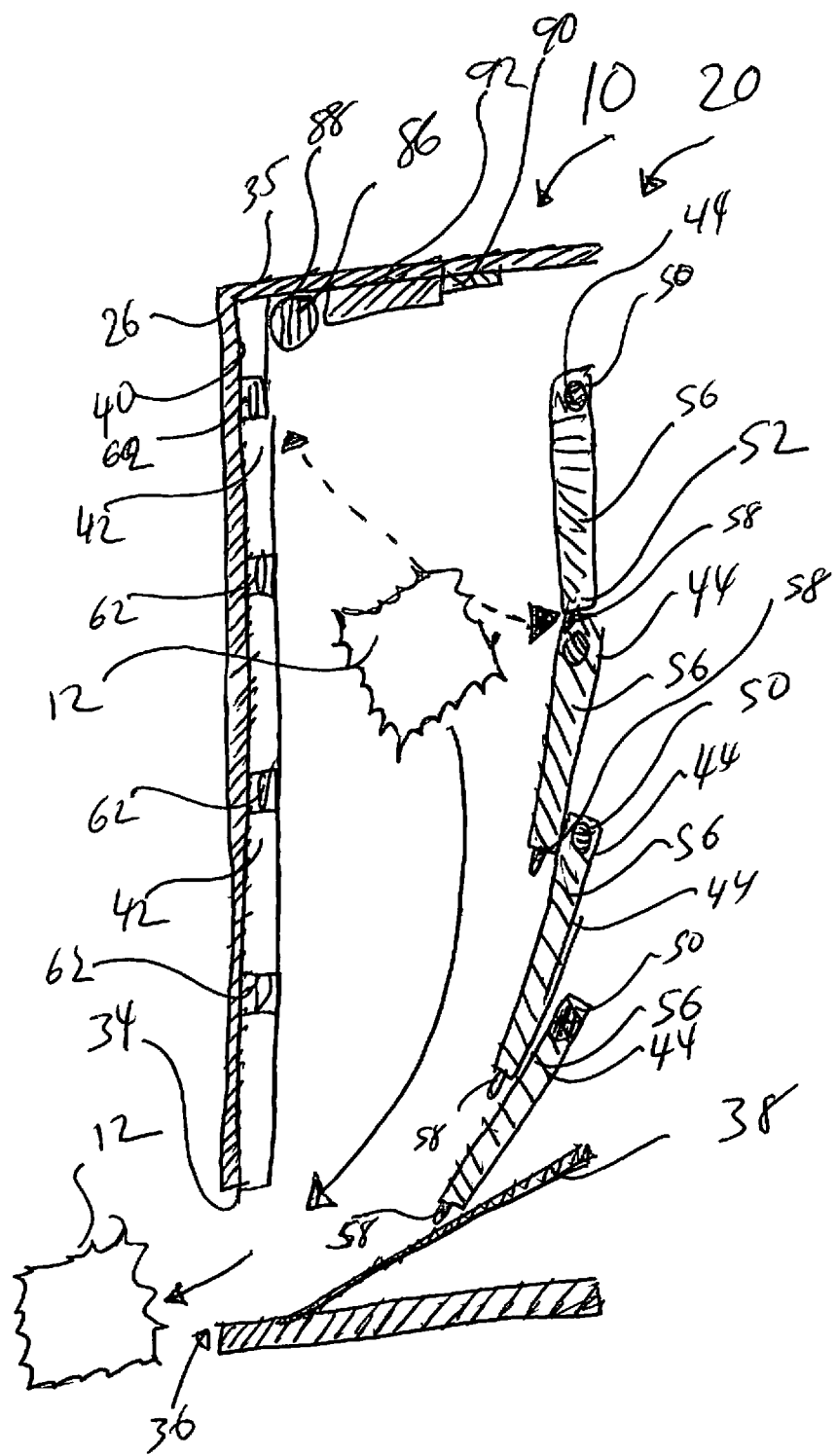
FIG. 3 is substantially showing a cutaway side elevation view of one possible embodiment of the present invention's drop shelves in the dropped position.

When the motorized latch 60 is activated, the latch projection 58 is released to allow the drop shelf 44 to pivot down from the horizontal position 54 to the non-horizontal drop position 56 (as substantially shown in FIG. 3.) It has been found that such the drop shelf 44 with such a three point connection to the cabinet 26 provides for a more stable operation and is much less likely to bind within the cabinet 26 that a four point connection drop shelf (not shown.)

As substantially shown in FIG. 3, the drop shelving 44 as it generally moves into the dropped or non-horizontal position 56 could have its front edge 46 rest upon the drop shelving 44 directly below it (e.g., proximate to the back edge 48 of the drop shelf 44 below it). In this manner, by adjusting the distance between the drop shelf 44 above and the drop shelf 44 below a respective drop shelf 44, the drop shelves 44 (e.g., the ones that are located lower in the stack) could not necessarily drop to a totally vertical drop position. The lowest drop shelf 44 could drop and come to rest upon the angled slide 38 and have the greatest angle of deviation away from a true vertical orientation when in the respective drop position 56. The next highest drop shelf 44 (e.g., the drop shelf 44 directly above the bottom drop shelf 44) when dropped could have a lesser degree of angle deviation away from a true vertical orientation in its drop position 56. The third from the bottom drop shelf 44 could have an even lesser angle of deviation from true vertical orientation in its respective drop position 56. As the angle of deviation generally continues to decrease for dropped drops shelves 44 located higher up in the vertical stack, the dropped drop shelves 44 in this manner can generally form a progressively angled slide 52 that reaches down to the angled slide 38. Instead of just vertically dropping the animal feed loads 12 directly upon the angled slide 38, the progressive slide's progressive pitch or slope assists the feed's initial vertical downward movement to a more horizontal outward movement. In this manner, the animal feed load 12 will be moving in a direction that when the animal feed load 12 hits the angled slide 38 to substantially assist the animal feed load 12 to move along out through the feed delivery slot 34 to exit the automated animal feed dispenser 20.

Figure 4:
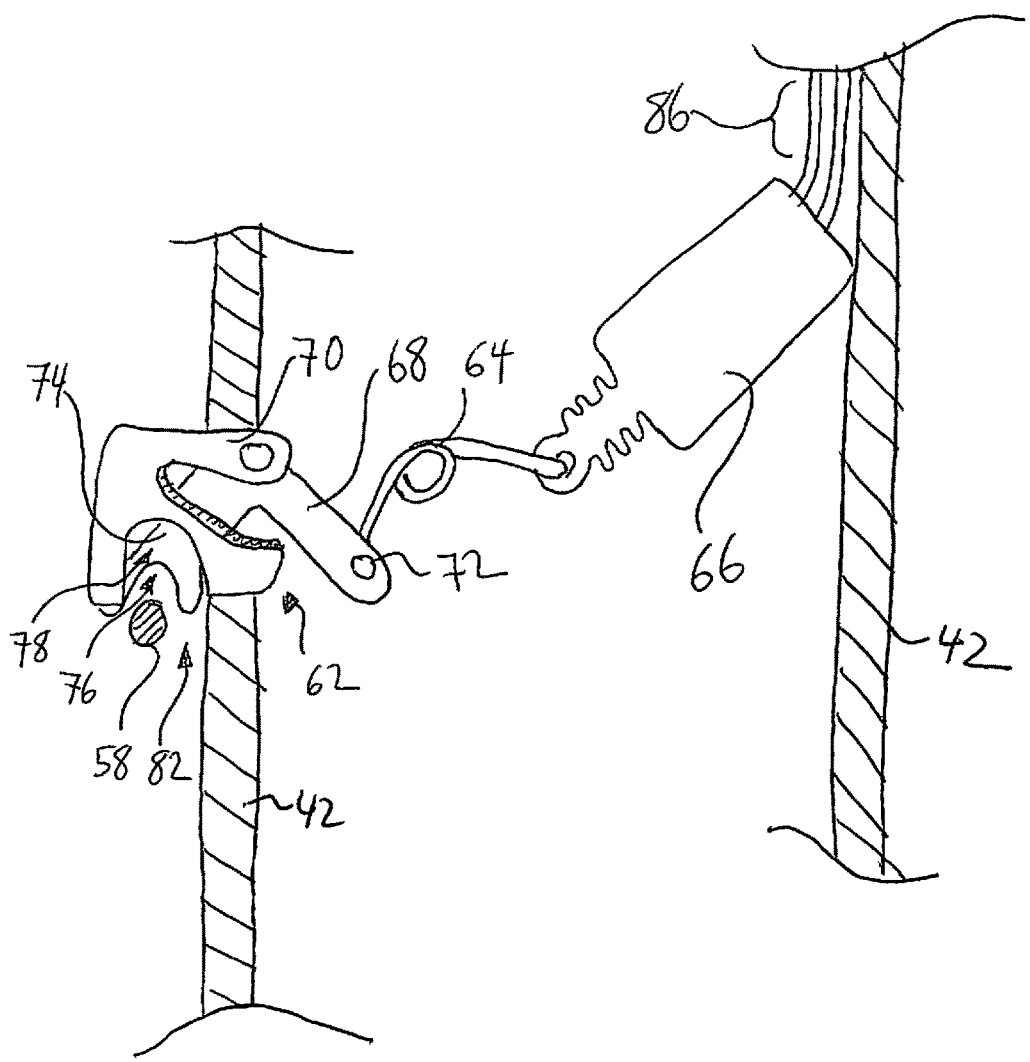
FIG. 4 is substantially showing a cutaway perspective view of one possible embodiment of present invention's a motorized latch for a respective drop shelf.

As generally shown in FIG. 4, the motorized latch 60 could comprise a lock mechanism 62, a connector 64 and motorized actuator 66 that are generally covered and held in place by the hat channel cover 42 so that the lock mechanism 62 (e.g., an automotive door latch lock may selected due to its inherent reliability and ruggedness) protrudes (e.g., through an aperture in the hat channel cover 42) out of the hat channel cover 42 and into the hollow interior 32 to removably engage a respective latch projection 58. The lock mechanism 62 may be connected by the connector 64 (e.g., a swing link, or v-shaped single coil spring or the like) to the motorized actuator 66.

Figure 5:
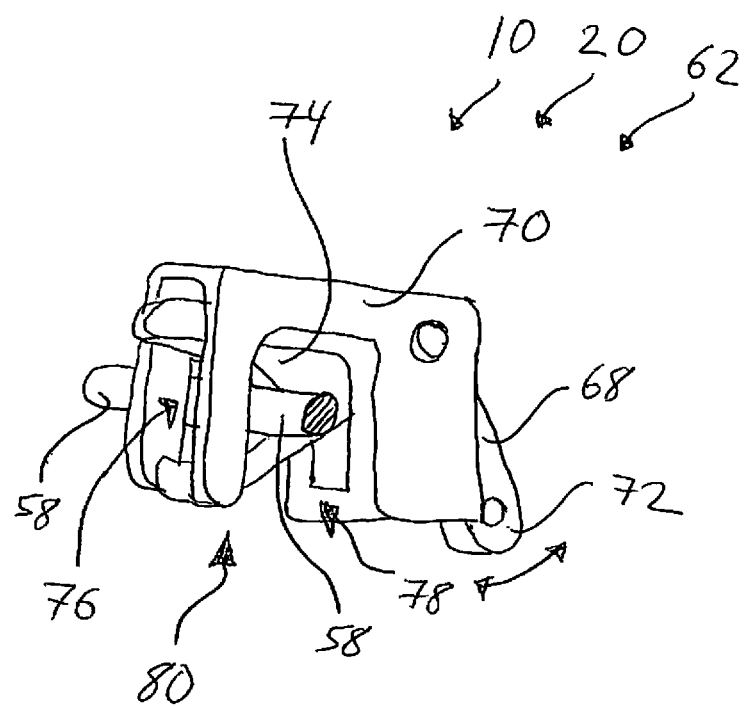
FIG. 5 is substantially showing a perspective view of one possible embodiment of the present invention's the lock mechanism in the closed position.
Figure 5A:
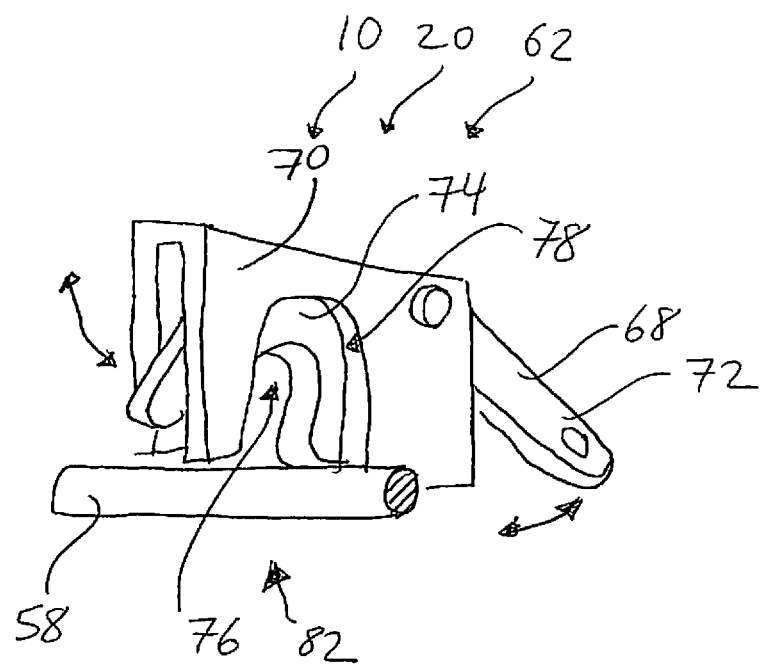
FIG. 5A is substantially showing a perspective view of one possible embodiment of the present invention's lock mechanism in the open position.

As substantially shown in FIGS. 5 and 5A, one possible embodiment of the lock mechanism 62 could be an automotive door latch sold under the Southco or Eberhard brands that are available through distributors Allegis Corp distributors, 3895 Corsair Street, Suite A, Reno, Nev. 89502. The lock mechanism 62 could comprise a V-shaped member 68 pivotally attached by the middle of the V to a respective lock frame 70. The V-shaped member could have two arms, first arm 72 that may movably connected (by the end of the first arm 72) to the connector 64 while the second arm 74 (by its respective end) has a C-shaped cutout 76. The V-shaped member 68 could be pivotally attached at one end of the lock frame 70 with the other end of the lock frame 70 that may have a U-shaped cutout 78 that can movably receive the second arm 74.

In moving the lock mechanism 62 from an open position 82 into a closed position 80 (e.g., the operator, not shown, may move the drop shelf 44 into the horizontal position 54 by pressing the latch projection 58 into second arm's C-shaped cutout 76), the second arm 74 generally moves to be placed down within the lock frame's U-shaped cutout 78. This closing motion or movement may allow a portion of the lock frame 70 that generally defines the U-shaped cutout 78 to generally cap off or otherwise block the pivoting member's C-shaped cutout 76. In this manner, the engaged latch projection 58 may be held within the C-shaped cutout 76 by the lock frame 70 (e.g., generally holding the drop shelf 44 in the horizontal position 54.)

In subsequently moving to a lock mechanism's open position 82, the motorized actuator 66 (e.g., in combination with the connector 64) could move the V-shaped pivoting member 68 to pivot the second arm 74/C-shaped cutout 76 out of the lock frame's U-shaped cutout 78. As the C-shaped cutout 76 generally clears the lock frame 70, the C-shape cutout 76 could release the latch projection 58 to substantially allow the respective drop shelf 44 to move from its horizontal position 54 to its non-horizontal drop position 56 dropping its animal feed load 12 down onto the angled slide 38.

Figure 6:
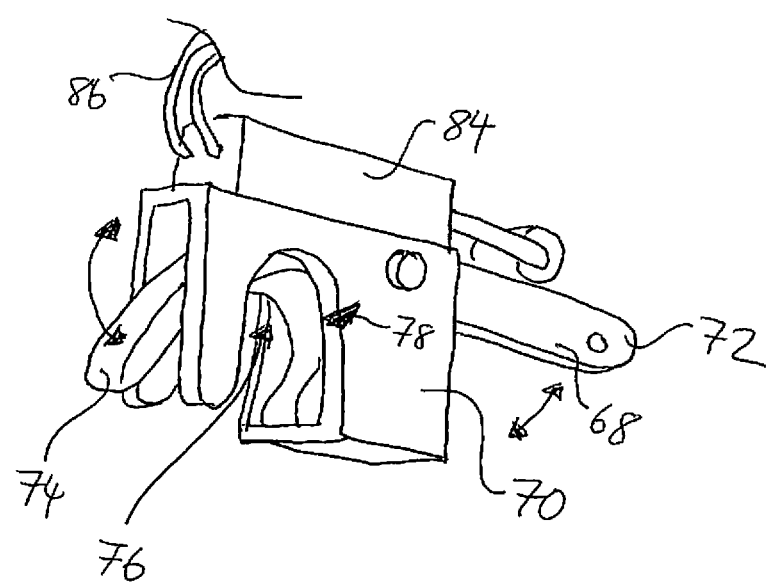
FIG. 6 is substantially showing a perspective view of a reset switch for the lock mechanism.

As substantially shown in FIG. 6, one or more embodiments of the invention 10 could further feature an electrical on-off (e.g., reset) switch 84, such a one-pole, single throw contact switch, that can be electrically connected to the electronic latch control system 86 and be physically connected to the lock frame 70. The switch 84 could indicate to the latch control system 86 (e.g., sequencer circuit 90) when a respective lock mechanism 62 is in an open and/or closed position 80, 82. In one possible embodiment, only one such switch is used and is attached to the lock mechanism 62 controlling the bottom most drop shelf 44. In this manner, when the bottom most drop shelf 44 is reset into the horizontal feed position (and generally that drop shelf needs to be horizontally reset prior to most if not all feed reloadings) the sequencer circuit could be reset for the next round of sequenced feedings.

In one possible embodiment, the electrical switch 84 could be turned on-and-off based on the position of the V-shaped pivot member relative to the lock frame 70. In controlling an electrical signal to the sequencer circuit 90, the electrical switch 84 can be used to automatically reset the sequencer circuit 90 as for the operational purposes when the drop shelves 44 are manually placed into the horizontal position 54 by the operator (not shown.)

The connector 64 (e.g., a V-shaped spring) could be chosen based on the need to apply closing leverage by the motorized actuator 66 to lock mechanism 62. (As substantially shown in FIG. 4.) The greater the overall length of the connector 64, generally, the greater closing power is exerted by the motorized actuator 66 upon the lock mechanism 62. Similarly, when the connector 64 provides greater closing power, it provides greater resistance to opposing motions that open the lock mechanism 62, so a balance must be struck between the two purposes.

Figure 4A:
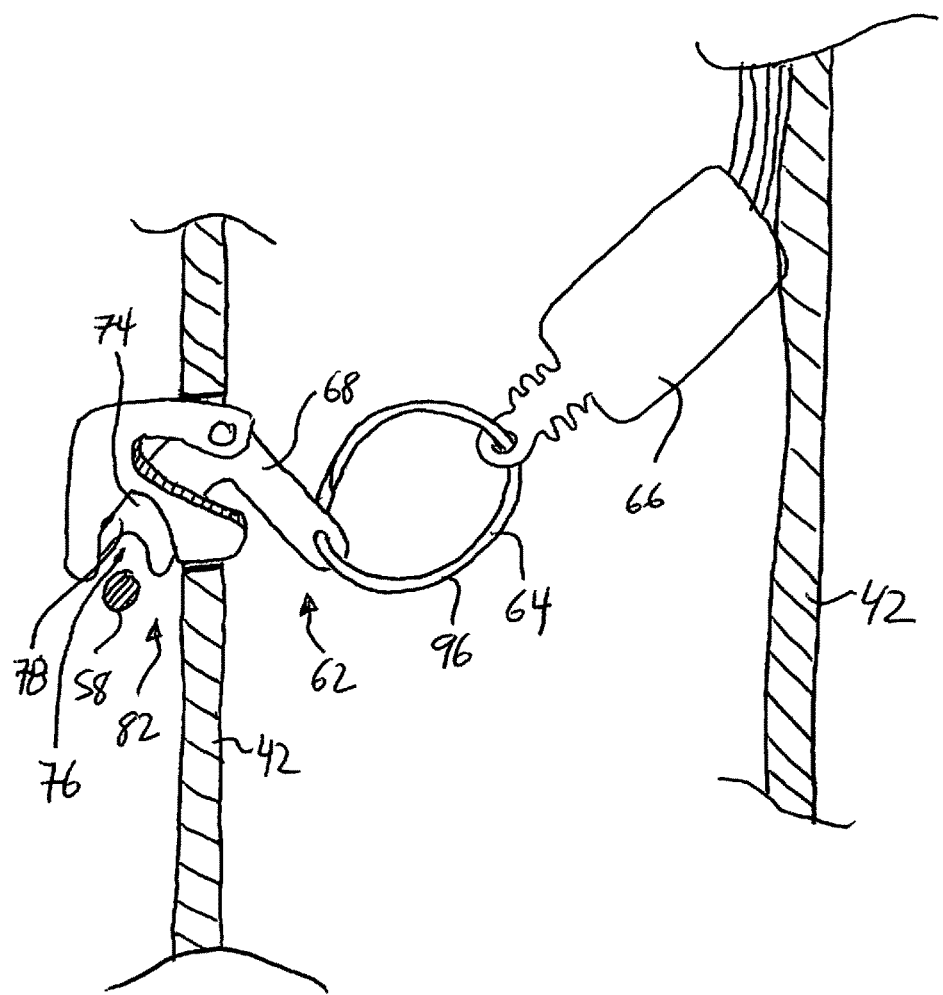
FIG. 4A is substantially showing a cutaway perspective view of another possible embodiment of present invention's a motorized latch for a respective drop shelf.
Figure 4B:
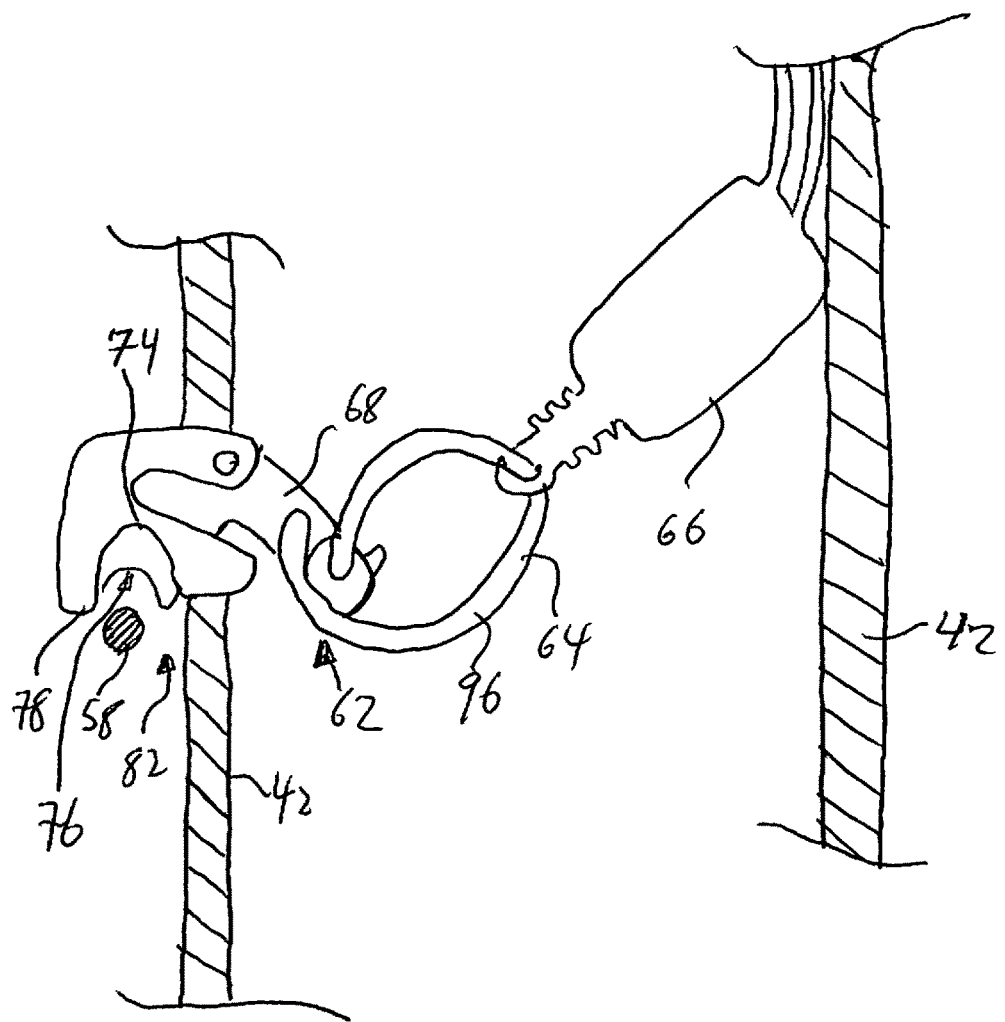
FIG. 4B is substantially showing a cutaway perspective view of yet another possible embodiment of present invention's a motorized latch for a respective drop shelf.

It has been found by the inventor when the connector 64 is a V-shaped spring, under certain operating conditions, the V-shape spring may be so compressed that balancing between the two purposes is lost and V-shape spring jams upon itself to generally interfere with the operation of the motorized latch (e.g., preventing manual resetting of the motorized latch 60 when locking the respective drop shelf into place.) To generally avoid such issues, the V-shaped spring can be successfully replaced with a circle shaped spring 96 to connect lock mechanism 62 to the motorized actuator 66. (As substantially shown in FIGS. 4A and 4B.) The motorized actuator 66 in such a substitution may have to be placed a slightly different angle and position to accommodate this version of the connector 64.

Figure 7:
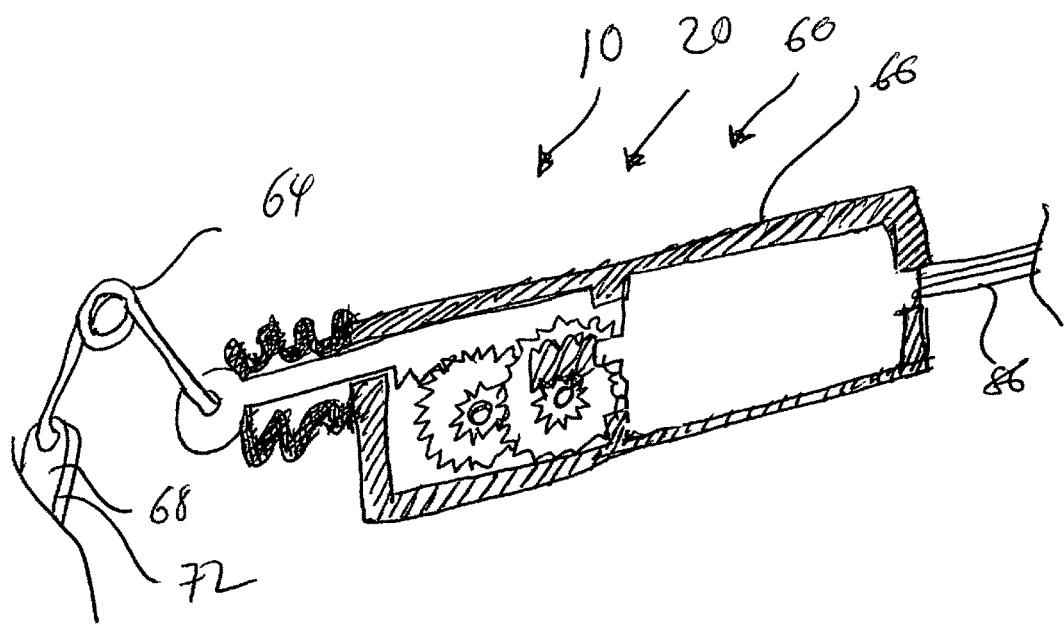
FIG. 7 is substantially showing a cutaway elevation view of the connector and motorized actuator.

In one possible embodiment as generally shown in FIG. 7, the motorized actuator 66 could an automotive electric door lock actuator that may have an arm that is substantially and linearly propelled by a geared motor within a substantially sealed case. One such possible motorized actuator 66 could be part number JW302 come from AEW, 17900 Crusado Drive, Cerritos, Ca, 90703.

The motorized actuator 66 is generally only energized or powered in the present invention 10 to move the V-shaped pivoting member 68 in one direction to substantially open the lock mechanism 62 and releasing the latch projection 58/drop shelf 44. The operator (not-shown) may reach through the rear opening 30 to generally raise the respective drop shelf 44 from the drop or non-horizontal position 56 to the horizontal position 54 to manually engage the lock mechanism 62 that may hold the drop shelf 44 in horizontal position 54 (generally shown in FIGS. 1 and 2.)

Figure 8:
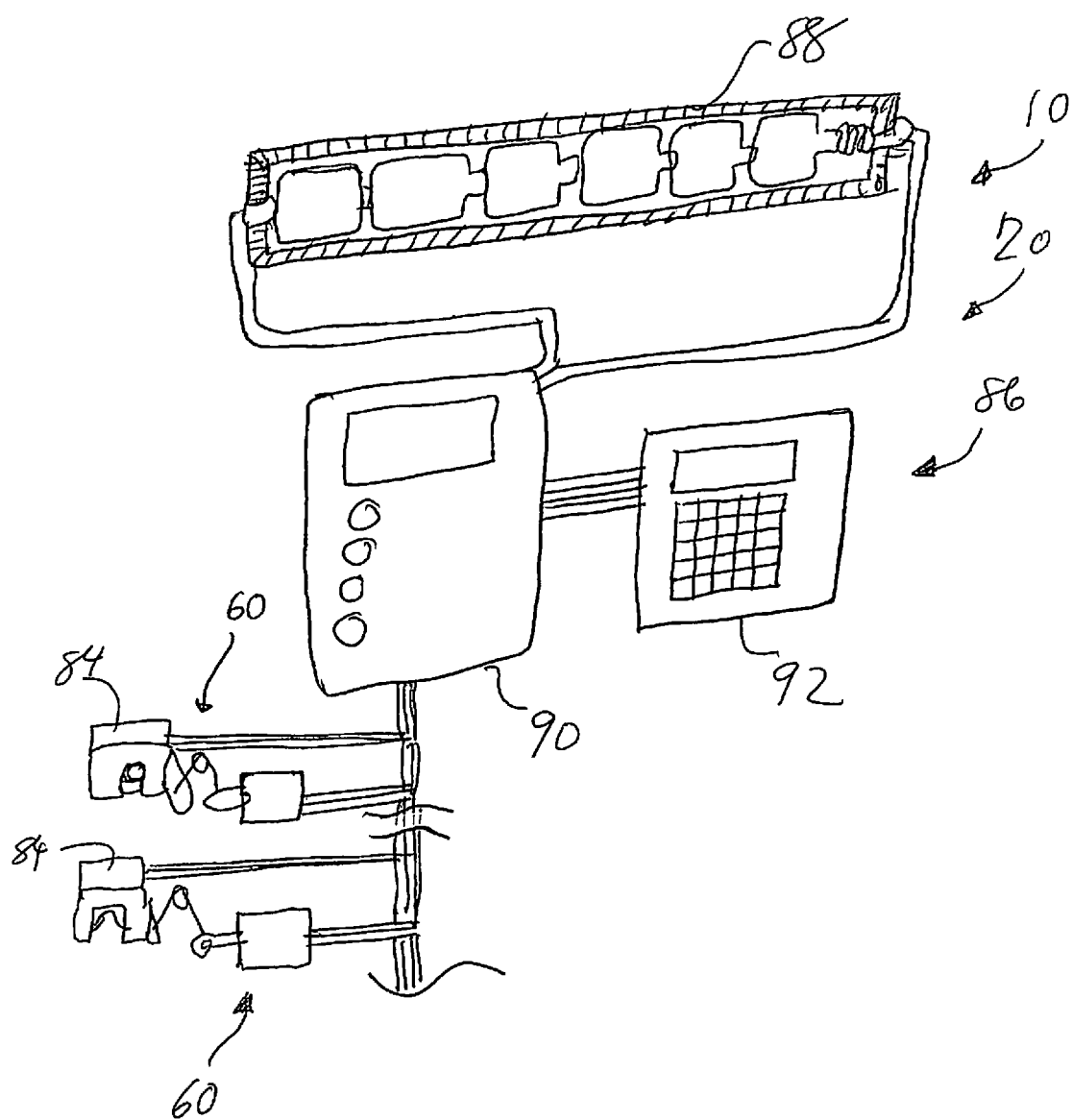
FIG. 8 is substantially showing a representation of the latch control system.

As substantially shown in FIG. 8, the electronic latch control system 86 as used to control the operation of the motorized latches 60 (e.g., opening of the lock mechanisms 62), could comprise a power source 88 (e.g., batteries, solar panels, and the like, etc.) connected to the sequencer circuit 90 and the timing circuit 92 that directs an electrical current from the power source 88 to the individual motorized latches 60 for the timed and sequential dropping of the drop shelves 44 loaded with animal feed loads 12. The sequencer circuit 90 could be set to establish the order that the drop shelves 44 would drop their animal feed loads 12 down onto angled slide 38 (e.g., bottom-to-top order: the bottom drop shelf 44 would be the first to drop its animal feed load 12, then the drop shelf 44 directly above it could then drop its animal feed load 12 and so forth.) The drop sequence for the drop shelves 44 would then work up the drop shelf stack to conclude with the top drop shelf dropping its animal feed load 12 last. The timer circuit 92 could be set to determine when each respective drop shelf 44 would drop its animal feed load 12.

The power source 88 in one embodiment could be a set of household alkaline D cell batteries connected in series. The batteries could be contained in a length of tubing that has removable end caps with conductors that are connected to the remaining elements of the latch control system. A spring within the tube could bias the batteries together to ensure series connection together. Other possible power supplies could be solar panels (not shown) to power the invention 10.

In one possible embodiment, the sequencer circuit 90 could be part number 9262A produced by Phenix Controls, Inc., 1619 S Minnie St, Santa Ana, Calif. 92707. The sequencer circuit 90 could be programmable for each drop shelf motorized latch. The sequencer circuit 90 once programmed with the drop order of the drop shelving stack 44 could then cause the respective drop shelving 44 to drop when the drop shelving 44 receives the electronic command to do so from the timing circuit 92. The reset switch 84 could inform the sequencer circuit 90 what position a respective drop shelf 44 is in, thereby eliminating the need by the operator (not shown) to manually reprogram/reset the sequencer circuit 90 for the next set of feeding operations when the vertical stack of drop shelves 44 are manually replaced in the horizontal positions 54.

In one possible embodiment, the timer circuit 92 could be a timer clock, part number 10728 as produced by Phenix Controls, Inc., 1619 S Minnie St, Santa Ana, Calif. 92707. The timer circuit 92 could be timed to send an electrical impulse to trigger the dropping of drop shelf 44 by the sequencer circuit 90. The date and times programmed into the timer circuit 92 as to when a timer signal is issued to the sequencer circuit 90 could control the dropping of the drop shelves 44 and the delivery of the animal feed load 12 to the animals (not shown.)

Figure 9:
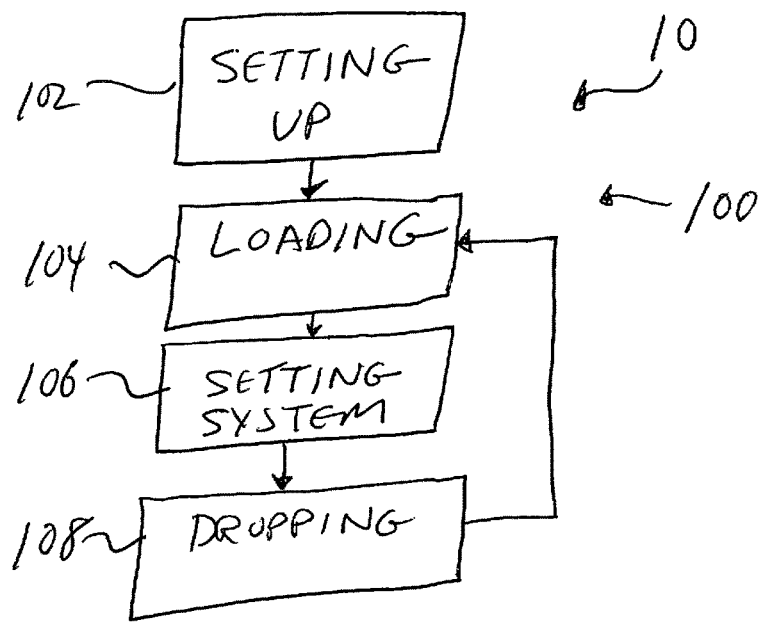
FIG. 9 is substantially showing a flowchart schematic for one possible process embodiment for operating the present invention.

As generally shown in FIG. 9, one possible method 100 of operation for the invention 10 could start with step 102, setting up the invention. In this step, the automated animal feed dispenser could be placed at a desired feed dispensing location. For corralled livestock, the location could outside of the corral yet next to a fence defining the corral. Generally, such fencing consists of a set of horizontal rails held in place by the vertical posts. The feed delivery slot generally being set so as to fit between the ground and first railing of such fences. The automated animal feed dispenser could be attached directly to such a fences through the use of suitable fasteners and/or fastening devices. Alternatively, posts (e.g., metal pipes anchored in cement) could be placed proximate to the fence and the three-sided cabinet could be suitably attached to such posts to hold the invention in place and proximate to the fence. Yet, in another embodiment, a concrete slab could be poured next to the fence with suitably protruding cable, bolts and the like to which the bottom of the three-sided cabinet can be attached to anchor the three-side cabinet proximate to the fence.

For wild animal feedings, the three-sided cabinet could be suitable anchored to the ground in the area of desired feed disbursement. Additionally, the open rear could be secured by a hinged door to substantially limit an animal's access to the hollow interior and the feed that is loaded upon the drop shelves. Once this step is substantially completed, the process 100 could proceed to step 104, loading the invention.

In step 104, loading the invention, the drop shelving as needed can be raised from their respective drop positions into their horizontal loading positions. During this raising action, the drop shelf's latch projection can engage a respective motorized latch, in particular, the respective C-shaped cutout of the V-shaped pivoting member as that C-shaped cutout extends outside of the hat channel cover (e.g., through an aperture in the hat channel cover) and onto the hollow interior. As the drop shelf moves up into its horizontal position, the latch projection moves the pivoting member so that the arm forming the C-shaped cutout is moved within the U-shaped cutout of the lock frame. In this manner, the lock frame could block the latch projection from moving out of the C-shaped cutout to substantially hold the drop shelf in the horizontal position.

In an embodiment of the invention 10 mounting an electrical switch proximate to the lock frame to monitor the movement and/or position of the pivoting member relative to the lock frame, the action of the pivot member lowering its arm with the C-shaped cutout into the lock frames U-shaped cutout can cause the electrical switch to disrupt current or otherwise send a signal to cause the sequencer circuit to reset its logic circuit for those shelves placed in the horizontal position.

When all the drop shelves are in their respective horizontal positions, the automated animal feed dispenser can be appropriately loaded with feed. The operator, for example, in feeding horses may break apart a horse hay block into sections, each section being loaded upon a respective drop shelf as feed load. In one possible embodiment of the invention 10 being used for non-corralled animals and is equipped with a door, the door can be first opened to allow operator access to the hollow interior. The operator can then reach into the hollow interior to place feed loads upon respective drop shelves in the horizontal positions. When this step is substantially completed, the process 100 could proceed onto step 106, setting the latch control system.

In step 106, setting the latch control system, the operator after placing the feed loads upon the shelves, could reach above the top drop shelf to reach the underside of the top where the sequencer circuit and timer circuit could be stored (along with certain types of power supplies, such as the plurality of batteries in their protective case.) In the instance of the series of batteries being a power source, the operator could activate a power switch to allow the powering of the latch control system.

Both circuits could have a visual display (e.g., LED, LCD or the like) so show the operating status of the respective device and a user interface such a set of buttons or key pad to allow the operator to set the respective circuits. The operator could input into the sequencer circuit (e.g., through the buttons/key pad) the linear order in which the drop shelves drop (e.g., the lowest shelf drops first, followed by the next highest shelf, that bottom-to-top pattern being continued until the upper most shelf has dropped down.) The signal sent by the respective reset switch could be used to reset the sequencer when all the dropped shelves have been manually placed back into the horizontal loading position. Alternatively, the operator could directly reset the sequencer circuit user using the sequencer circuit's user interface and observe the visual display to ensure that proper drop sequence has been loaded into the sequencer circuit.

The operator could then set the timer circuit using the timer circuit's user interface and visual display to program the timer circuit to determine when (e.g., date[s] and time[s]) when the timer circuit would send signals to the sequencer circuit to activate the next-in-line motorized latch to drop the next-in-line drop shelf. When the initiation time/date had been set for the timer circuit and the programming for the latch control system is configured as desired, the door-based embodiment can have its door closed to otherwise secure the hollow interior (and feed) from grazing animals. In subsequent feed reloadings of the machine, the latch control system, previously programmed for the drop sequence, could generally just need a reactivation or restart of the timer circuit to imitate the latch control system. As this step is substantially configured, the process 100 could proceed to step 108, dropping the drop shelves.

In step 108, dropping the drop shelves, the electronic timer as it follows its programmed schedule could at the approximate time and date send a signal, impulse or otherwise communicate with sequencer circuit to cause that circuit to power the specific motorized latch circuit for the respective motorized latch of the respective drop shelf (e.g., starting with the first or lowest drop shelf in the vertical stack) that is supposed to drop and release its feed load according to its place within the ordered sequence. When the motorized actuator of the motorized latch is energized, the arm of the actuator moves to move the connector. The connector in turn moves the first arm of V-shaped pivoting member causing the second arm (and the C-shaped cutout holding the projection latch) to pivot out of the lock frame's U-shaped cutout. Once the C-shaped cutout is no longer being blocked by the lock frame, the latch projection is dropped/released from the C-shaped cutout to allow the respective drop shelf to fall into the drop position and release its feed load downward towards the angled slide. When the feed load hits angled slide, the feed load is directed to the feed delivery slot. In this manner, the dropped feed load exits the hollow interior to be delivered to the external environment for animal consumption.

As the drop shelves of the vertically stacked set continue to be dropped to deliver their feed loads to the angled slide, the drop shelving as it moves into the respective dropped positions could have a respective front edge rest upon the drop shelving directly below (in the case of the bottom most drop shelving, the bottom drop shelf could rest its front edge upon the angled slide.) In this manner, by adjusting the distance between the drop shelves, the drop shelves could not necessarily drop to a totally true vertical drop position but be angled away from true vertical. The lowest drop shelf could drop and come to rest upon the angled slide and have the most angle of deviation away from true vertical. The next highest/second drop shelf (e.g., the drop shelf directly above the bottom drop shelf) when dropped could have a lesser degree of angle deviation away from a true vertical. The third from the bottom drop shelf could have even lesser angle of deviation from true vertical orientation. As the angle of deviation continues to decrease for dropped drop shelves located higher up in the vertical stack, the overlapping dropped drop shelves generally form a progressively angled slide that reaches down and generally blends into the angle slide. Instead of just dropping animal feed loads straight down directly upon the angled slide and then using just the angled slide's slope to propel the animal out of the invention, the progressively angled slide's progressively changing pitch or slope could further assist to direct or change the animal feed's initial vertical drop downward movement into a movement that encompassing more of a horizontal outward delivery orientation. In this manner, the dropped animal feed load as it contacts the progressively angled slide will be moving from just vertical direction so that when the dropped animal feed hits the angle slide the deflected vertical direction will assist the drop feed out of the feeder.

When this step is substantially completed and the operator wishes to reuse (reload) the inventions for more feedings, the process 100 could return to step 104, loading the invention.

CONCLUSION

Although the description above contains many specifications, these should not be construed as limiting the scope of the invention but as merely providing illustrations of some of the presently preferred embodiments of this invention. Thus, the scope of the invention should be determined by the appended claims and their legal equivalents rather than by the examples given.

As seen in the drawings and as described in the specification, the invention could be an automated animal feed dispenser using a cabinet housing a vertical stack of spaced-apart drop shelving, each of which could hold its own animal feed. Each drop shelf could be hingedly attached by a rear edge to the cabinet to allow the drop shelf to pivot downward from a horizontal feed storage position to a vertical feed drop position. The use of gravity to move the drop shelves improves the reliability of the invention. A latch control system with timing and sequencing circuitry controls the drop timing and sequence of the drop shelves to regulate the delivery of their feed loads. An electrical switch monitoring capacity could inform the latch control system when a drop shelf has moved between positions to provide easier reset capacity. The dropped drop shelves can overlap one another to further form a progressively angled slide to further aid the delivery of dropped feed to the external environment.

What is claimed:

1. An automated animal feed dispenser comprising:
   (A) a three-wall cabinet comprising a middle wall straddled by two side walls to form a rear opening by which a hollow interior as formed by the three-wall cabinet can be accessed, the middle wall further having a bottom portion defining a feed delivery slot that connects to an angled slide located within a bottom of the hollow interior;
   (B) a set of vertically stacked and spaced apart drop shelves that can individually support animal feed, the set being hingedly connected to the three-wall cabinet to locate the set within the hollow interior above the angled slide, each drop shelf having a front edge and a back edge;
   (C) a plurality of motorized latches, each motorized latch of the plurality comprising a spiral spring that continuously connects a motorized actuator to a lock mechanism, the spiral spring having a single ring that is received simultaneously through an aperture in the actuator and an aperture in a pivoting member of the lock mechanism, the lock mechanism removably attaches to the respective drop shelf, each motorized latch of the plurality being located on a backside of the middle wall within the hollow interior, each motorized latch of the plurality removably attaches to a respective drop shelf proximate to the front edge of that drop shelf to control the drop of the respective drop shelf;
   (D) an electronic latch control system that operates the plurality to sequentially drop the drop shelves in a timed manner from the horizontal position to a non-horizontal drop position;
   wherein when the drop shelves are dropped during operation, the drop shelves are configured to overlap one another to create a progressively angled slide within the hollow interior that empties down upon the angled slide.

2. The automated animal feed dispenser of claim 1 wherein those drop shelves distally located from the angled slide have more vertically oriented drop positions than other drop shelves that are more proximately located to the angled slide.

3. The automated animal feed dispenser of claim 1 wherein the progressively angled slide's pitch changes from a vertical orientation proximate to a top of the three-wall cabinet to a more horizontal orientation proximate to the angled slide.

4. The automated animal feed dispenser of claim 3 wherein the change of the pitch assists to channel an initial downward vertical movement of a dropped animal feed to a more horizontal outward movement.

5. The automated animal feed dispenser of claim 1 further comprising a hat channel cover that attaches to the backside of the middle wall to cover the motorized actuator.

6. The automated animal feed dispenser of claim 1 wherein when a lowest placed drop shelf of the set drops to rest upon the angled slide, the lowest placed drop shelf will have a drop position that has a greatest angle of deviation away from a true vertical of the remaining drop shelves of the set.

7. The automated animal feed dispenser of claim 1 wherein a bar bisects each drop shelf from the back edge to the front edge and projects outward to form a latch projection that removably engages the respective motorized latch for each drop shelf.

8. The automated animal feed dispenser of claim 1 wherein the electronic latch control system comprises a power supply connected to a programmable sequencer circuit and a timer circuit, the electronic latch system being electronically connected to the plurality.

9. The automated animal feed dispenser of claim 8 wherein an electrical reset switch electrically connected to the electronic latch control system resets the electronic latch control system as to the respective drop shelf when that drop shelf is moved into the horizontal position as that drop shelf removably engages the motorized latch.

10. An automated animal feed dispenser comprising:
(A) a three-wall cabinet having a middle wall straddled by two side walls to form a rear opening by which a hollow interior formed by the three-wall cabinet can be accessed, the middle wall further having a bottom portion defining a feed delivery slot that connects to an angled slide located within a bottom of the hollow interior;
(B) a set of vertically stacked and spaced apart drop shelves that can individually support animal feed, the set of drop shelves being located within the hollow interior above the angled slide, each drop shelf having a front edge and a back edge, the drop shelf hingedly connects to the two side walls;
(C) a plurality of motorized latches located on a backside of the middle wall, each motorized latch of the plurality comprises a spiral-shaped spring that continuously connects a motorized automotive door lock actuator to a lock mechanism to transfer an operational motion of the motorized automotive door lock actuator to a lock mechanism, the spiral spring having a single ring that is received simultaneously through an aperture in the actuator and an aperture in a pivoting member of the lock mechanism, the lock mechanism removably attaches to a respective drop shelf to hold the respective drop shelf at a feed supporting horizontal position; and
(D) an electronic latch control system that operates the plurality of motorized latches to sequentially drop the drop shelves by a bottom-to-top order in a timed manner, the drop shelves when so dropped from their respective feed supporting horizontal positions to their respective non-horizontal drop positions, the dropped drop shelves overlap one another to create a progressively angled slide.

11. The automated animal feed dispenser of claim 10 further comprising a hat channel cover that attaches to the backside of the middle wall to cover the motorized automotive door lock actuator, portions of the lock mechanisms and a portion of wiring connecting the plurality to the electronic latch control system.

12. The method of operating an automated animal feed dispenser comprising the following steps:
(A) providing an automated animal feed dispenser comprising a three-wall cabinet comprising a middle wall straddled by two side walls to form a rear opening by which a hollow interior as formed by the three-wall cabinet can be accessed, the middle wall further having a bottom portion defining a feed delivery slot that connects to an angled slide located within a bottom of the hollow interior, a set of vertically-stacked and spaced-apart drop shelves that can individually support animal feed located within the hollow interior, each drop shelf hingedly connects to the cabinet above the angled slide, each drop shelf having a front edge and a back edge, a plurality of motorized latches supported by the three-sided cabinet, each motorized latch of the plurality comprises a motorized automotive door lock actuator that connects by a spiral shaped spring to a lock mechanism to control the respective drop of a respective drop shelf, the spiral spring having a single ring that is received simultaneously through an aperture in the actuator and an aperture in a pivoting member of the lock mechanism, the lock mechanism removably attaches to the respective drop shelf, each motorized latch of the plurality being located on a backside of the middle wall within the hollow interior, each motorized latch of the plurality removably attaches to a respective drop shelf proximate to the front edge of that drop shelf to control the drop of the respective drop shelf, a latch control system operates the plurality to drop the drop shelves in a timed and sequenced manner;
(B) placing one or more drop shelves of the set into respective feed supporting horizontal positions by engaging respective motorized latches of the plurality; and
(C) engaging the latch control system to sequentially drop the drop shelves by a bottom-to-top order in a timed manner to allow the dropped drop shelves to overlap one and other to form a progressively angled slide within the hollow interior, the progressively angled slide coming to rest upon the angled slide.

13. The method of claim 12 wherein the step of overlapping shelves to form a progressive slide further comprises a step of contacting the progressive slide with animal feed that is released from one of the dropped animal shelves.

14. The method of claim 13 wherein the step of overlapping shelves to form a progressive slide further comprises a step of encountering a changing pitch of the progressive slide by the dropped animal feed.

15. The method of claim 14 wherein the step of encountering a changing pitch of the progressive slide further comprises a step of changing an initial vertical drop movement of the released animal feed to a more horizontal outward movement before the released animal feed contacts the angled slide.

* * * * *